June 13, 1961 — T. LOEW — 2,988,208
FOOD PACKAGE
Filed Dec. 20, 1956 — 2 Sheets-Sheet 1
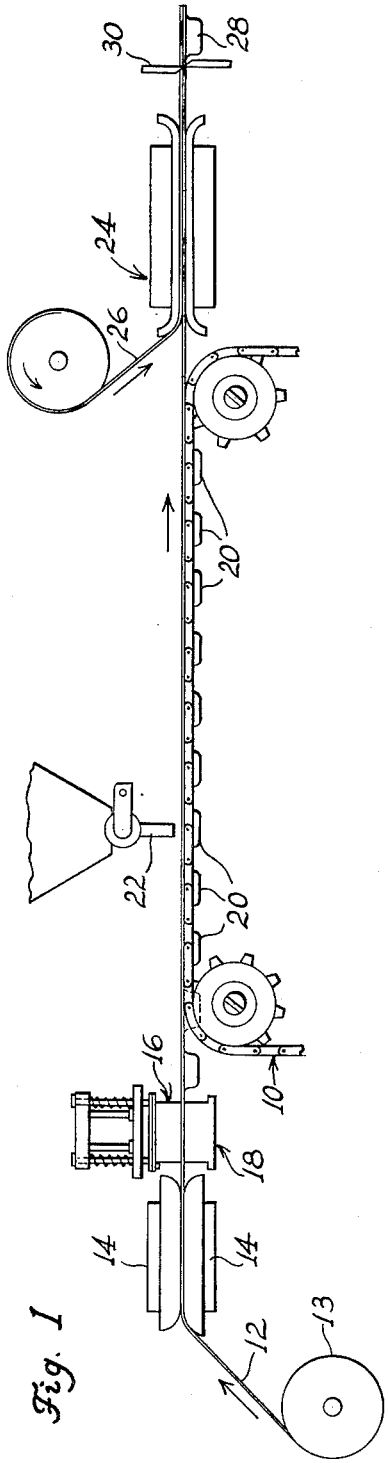
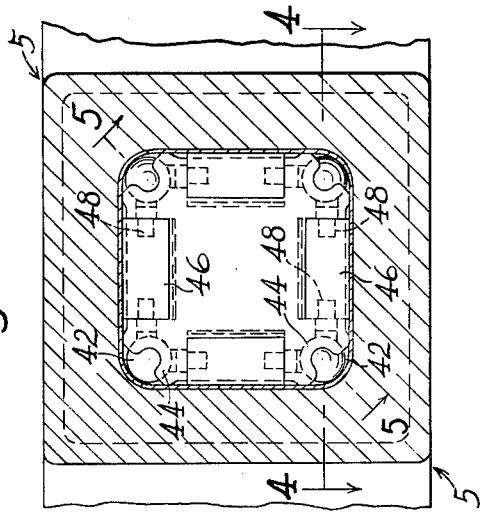
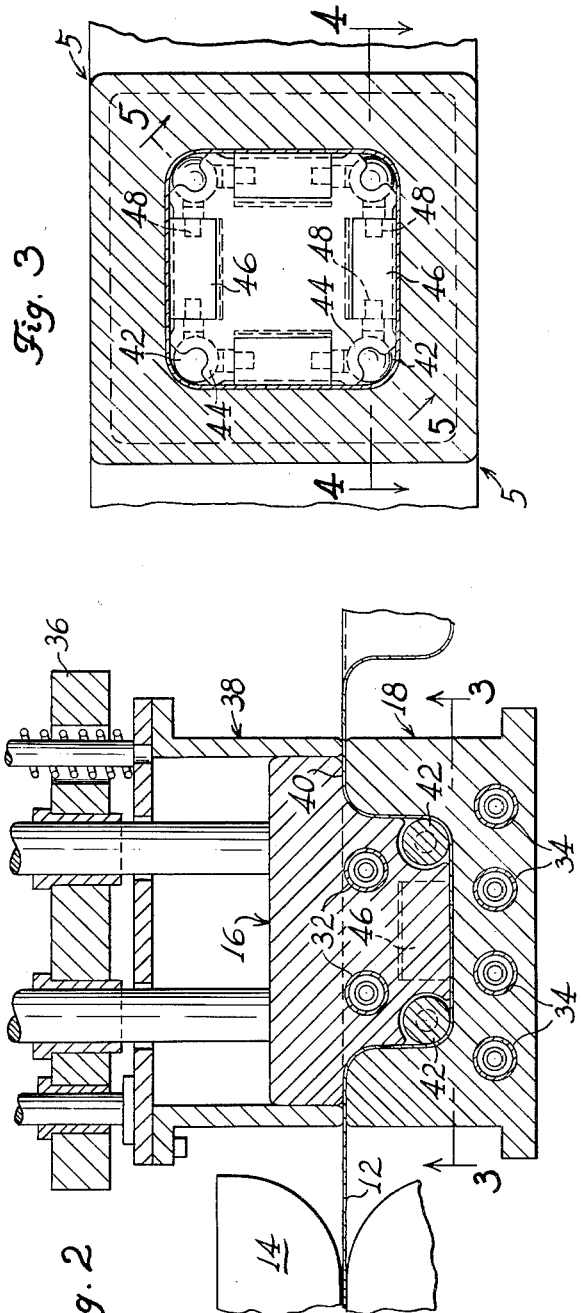
Inventor:
Theodore Loew
By Soans, Anderson, Luedeka & Fitch, Attys.

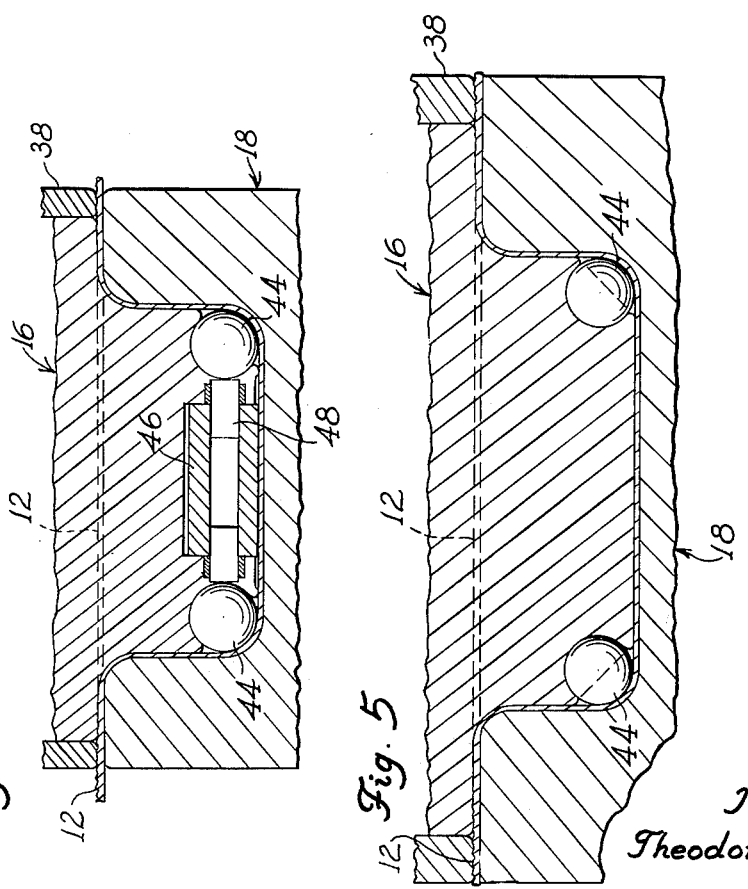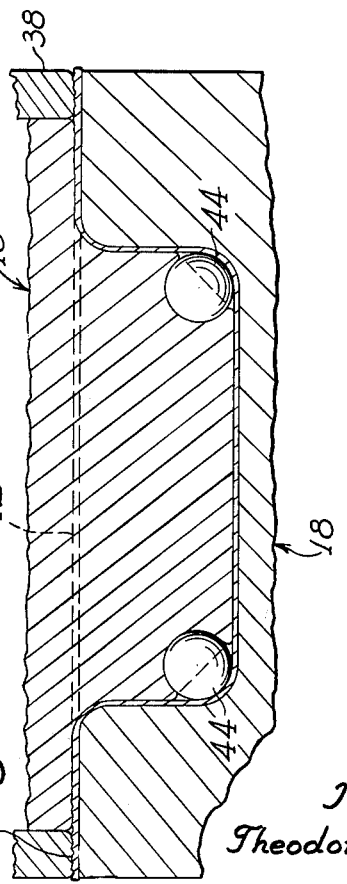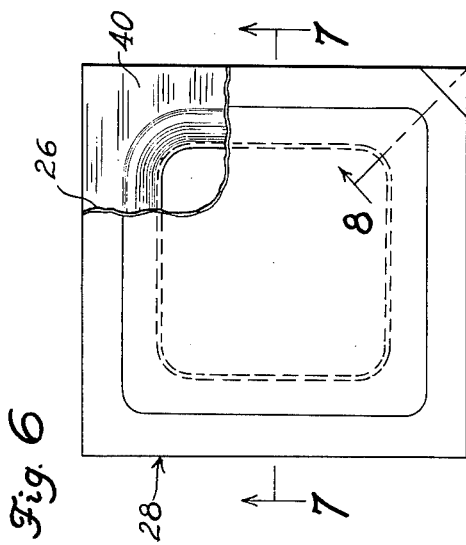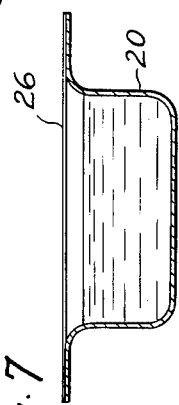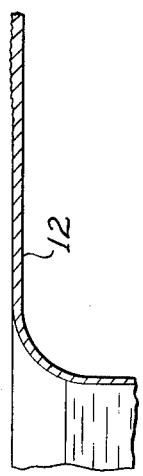

United States Patent Office 2,988,208
Patented June 13, 1961

2,988,208
FOOD PACKAGE
Theodore Loew, Stamford, Conn., assignor to National Dairy Products Corporation, a corporation of Delaware
Filed Dec. 20, 1956, Ser. No. 629,574
5 Claims. (Cl. 206—56)

This invention relates to improvements in packages, as well as a method and apparatus for forming the packages.

More particularly, the invention is concerned with providing economical packages having a lower cup-shaped container portion and a cover which extends across the open top of the container and is secured to a flat flange at the top of the container. The packages of this invention are especially adapted for use as containers for individual servings of food, such as butter, jam, jellies, etc., which may conveniently be served in package form. The packages may also be used for containing a variety of other materials and substances, particularly where such materials and substances are distributed in individual servings or sample quantities.

Several types of thermoplastic have been and are being used for molding suitable packages of this type. Thermoplastic materials are particularly desirable for this use because they are not only readily moldable and heat sealable, but they may also be selected for their water-resistant, moisture-proof and grease-resistant properties. These materials are also particularly advantageous in the food field because they are in general non-toxic, tasteless, and odorless.

However, these and other advantages of thermoplastic materials for use in packages of the type described have been off-set, in part, because of their relatively high cost, which makes the use of such materials impractical in operations where there is a low margin of profit and cost is a major consideration.

The present invention is particularly concerned with the providing of a low cost packaging unit having a molded or formed bottom portion or container, made of a web which is stretchable in a plurality of directions, and a top or cover disposed in sealed relation to the upper edges of the container. Still another object is to provide a packaging unit formed, at least in part, from a web of bibulous material which is stretchable in a plurality of directions, which unit is impervious to moisture and gas.

Further objects and advantages of the invention will become apparent through reference to the following description, and the accompanying drawings, wherein:

FIGURE 1 is a schematic view of apparatus adapted to produce packages in accordance with the invention disclosed herein;

FIGURE 2 is an enlarged cross-sectional view of the forming die shown in FIGURE 1 for molding the container portion of the package;

FIGURE 3 is a sectional view of the forming die, taken along line 3—3 of FIGURE 2;

FIGURE 4 is an enlarged sectional view taken along lines 4—4 of FIGURE 3, with the die in its normal upright position;

FIGURE 5 is a sectional view taken along lines 5—5 of FIGURE 3, with the forming die in its normal upright position;

FIGURE 6 is a plan view of the completed package, part of the cover being broken away to show the structure below;

FIGURE 7 is a sectional view of the package, taken along line 7—7 in FIGURE 6; and FIGURE 8 is an enlarged sectional view across one corner of the package, taken along the line 8—8 in FIGURE 6.

The present invention is particularly concerned with the provision of a low cost packaging unit which is especially advantageous for use in the packaging of small units, such as individual or sample portions of food. Generally, this low cost unit is made possible through the utilization of web material which is stretchable in a plurality of directions, for example, bibulous material which has been creped in at least two different directions. A sheet of material of this type is drawn or molded from its normal, planar condition into a cup or container having a bottom, a side wall extending upwardly from the periphery of the bottom, and a flange projecting outwardly from the upper edge of the side wall in generally parallel relation to the bottom. After the material to be packaged is placed in the container, a cover portion or top is disposed in overlying relation to the flange portion of the container and secured thereto in a suitable manner.

The stretchable web material used in the formation of the packaging unit, and the method and apparatus employed in making the package, may vary according to the type of substance or material to be packaged, the bond or seal required for the cover in each instance, and according to the quantity and rate of production anticipated for the particular packaged units which are to be provided. However, in any event, it is contemplated that the container or main body portion of the package will be formed of a material which is adaptable to stretching in a plurality of directions, so that such container can be formed by drawing, molding or other pressure forming of an integral sheet of the material into a body portion having a bottom and a side wall providing the required depth for the container.

Any suitable known means may be employed in the formation of the web that is to be used in forming the container portion of the package. Generally, the existing means for forming universally stretchable webs of paper or the like involve the formation of a web on a paper making machine, and then exposing the web to a double creping operation wherein the web is first creped in one direction and then is subjected to a second creping operation along a line disposed at an angle with respect to the line of the first creping operation. The creping operations may be conducted either with or without the creping adhesive material present in the web. The stretchability of the creped web is, of course, a function of the crepe ratio and, accordingly, the crepe ratio will be determined by the amount of expansion required in the formation of a container having a predetermined depth and cross-sectional area.

The stretchable web material used in forming the packaging unit, particularly the container portion thereof, may or may not include a resinous or thermoplastic material. If it is desired that the resulting package be impervious to moisture and/or gases, it is desirable that the creped web be either impregnated or coated with a suitable impervious material, such as a thermoplastic material. In this respect, the added material should be such that it is capable of expanding during the formation of the container, in order to preserve the impervious nature of the material. The use of a thermoplastic material in the container portion is additionally advantageous in that the presence of such material makes it easier to achieve a good bond between the flange portion of the container and the top or cover used in completing the package. If the thermoplastic material is added in the form of a coating to the stretchable web, such coating might be applied to one or both sides of the web.

In the formation of the container portion of the package, suitable means is provided for holding spaced-apart portions of the web while a forming die or other pressure means exerts a force transversely of the web between the held positions thereof to stretch the web and provide a container of predetermined depth. In this operation, it is desired that flange portions be provided adjacent the upper edge of the container for securing the cover thereto. These flange portions will, of course, retain substantially all of the original web thickness while the stretched portions forming the side walls and bottom of the container will be reduced in thickness. The stretching of the web along the side walls and bottom results generally in a straightening out of the crepe lines in the sheet to provide a somewhat smoother surface for these portions of the container than those surfaces remaining in the unstretched portion of the web. The smooth inner surfaces thus provided for the container facilitate the removal of the packaged material, particularly where semi-fluid materials are formed in the package by introducing such material in a fluid or semi-fluid state and allowed to solidify or jell.

If heat is required in forming the container, as in the use of a bibulous web containing thermoplastic material or having a coating thereof, the heat might be supplied by either the forming die itself or simply by heating the web prior to the container-forming operation. The amount of heat applied to the web should be sufficient to render the thermoplastic material pliable and expansible with the web, while retaining the desired impervious character of the web.

The substantially unstretched flange portions of the container retain essentially all of the original crepe lines and, therefore, provide an irregular surface which is particularly adaptable for bonding with the overlying surface portion of a cover for the package. As indicated above, this cover may be of any suitable material, depending largely upon the particular requirements for each condition. For example, if a very light bond between the cover and container is adequate, the cover portion may comprise a creped web which is lightly bonded in place by pressing the edge portions of the cover to the flanges of the container. Other types of bonding may be achieved through the use of pressure sensitive adhesives or thermoplastic materials in the cover and/or in the container flange. A heat sealing operation may be employed in bonding the cover to the container flanges in the event that thermoplastic materials are to provide the seal and a relatively stronger bond is desired.

A preferred form of cover for the container is a thermoplastic transparent material, such as Pliofilm. A cover of this type provides a view of the packaged material, while affording the use of a heat sealing operation to effectively bond the cover to the container.

Preferably, the cover portion is secured to the container in a manner such that it can be peeled away from the container flanges without seriously damaging the container. This will be effected largely by controlling the degree of bonding between the cover and container. In addition, in order to facilitate the removal of the cover from the container, there is preferably provided a portion of the cover which extends beyond the edge of the container flange, such as is shown in FIGURE 6. There is thereby provided a free edge portion of the cover, which can be grasped to aid in stripping the cover from the container.

The novel unit described above and the method of forming same is readily adapted to a mass production of such units on an assembly line basis. One form of apparatus which might be used in forming packages from a continuous web of the stretchable material is shown in FIGURES 1 through 5. As seen particularly in FIGURE 1, the apparatus provided for forming the packages in a continuous manner comprises generally an intermittently operated conveyor mechanism 10, which is adapted to draw a web 12 of the stretchable material from a supply roll 13 through a pair of heating elements 14 and into a pair of mating dies 16 and 18 which are also preferably heated. After the interconnected container portions 20 of the package are formed in the dies, they are moved in succession by the conveyor 10 to a filler mechanism 22 where the packaged material is placed in each of the succeeding containers. The filled containers 20 are then moved to a covering and sealing station 24 where a continuous web or film of material 26 is applied and suitably secured to the top flanges 40 of each container portion, as by heat sealing in the case of thermoplastic materials. The continuously formed and interconnected package units are then separated into individual units 28 by a knife 30, which severs the continuous webs transversely of their direction of movement at positions intermediate each pair of the connected containers.

The described apparatus is particularly adapted for use with stretchable webs including some thermoplastic material therein or having a coating of thermoplastic material on the web, as evidenced by the use of the heating elements 32 and 34 (FIGURE 2) in the formation of the container portion 20 of the packages and by the heat sealing operation afforded at station 24 for securing the cover 26 to the container.

As seen particularly in FIGURES 2–5, the forming die comprises a stationary female portion 18 and the relatively movable male portion 16. The female die portion 18 includes a plurality of heating elements 34 disposed adjacent the bottom thereof and is recessed to provide a generally rectangular cavity of substantial depth as related to its other dimensions. The male portion 16 of the die also includes heating elements 32 and is shaped in part to fit snugly within the female die 18. A stationary frame portion 36 of the machine provides a support and guide for a relatively movable hold-down structure 38, which is adapted to move vertically with respect to the female portion 18 of the die and to secure at least two opposite edge portions of the web 12 in position with respect to the forming die. Within the span of the hold-down structure 38, there is disposed the male portion 16 of the die, which is also mounted for movement relative to the frame 36 and the female member 18. As previously indicated, this upper die 16 is also provided with heating elements 32, primarily so that the heat is transmitted uniformly and quickly to both surfaces of the web 12. Of course, suitable means (not shown) is provided for actuating the hold-down structure 38 and the male die member 16 in properly timed relation to the longitudinal movement of the web.

It is preferred that most, if not all, of the stretching of the web 12 is achieved within the area defined by the side walls of the cavity in the female die member 18. There is thereby retained substantially all of the creping in the web portions forming the flange 40 (FIGURE 6) of the container and this creping is helpful in providing a bond between the container flanges and the cover strip 26. Moreover, the web 12 thereby retains substantially all of its original strength at the portions extending between the containers and is, therefore, more easily handled by an endless conveyor chain 20, or the like, which is adapted to support the interconnected containers 20 at such intermediate portions of the web. Of course, the bottoms of the containers might also be supported as they are moved along the packaging line, if such course seems advisable with structurally weak packages.

The described package 28 and the method for forming same is adapted to high speed operations, which is of considerable advantage and is an important factor in maintaining a low unit cost for the package. In such high speed operations, it is desirable to provide some means for eliminating any excessive friction between the die members and the web during the formation of the container portions 20. As seen in FIGURES 2–5, this is achieved by providing bearings around the peripheral portion of the movable die member 16, which are particularly effective in transmitting the required forming pressure to the web 12 with a minimum of friction on the web.

As seen particularly in FIGURES 2 and 3, the upper male die member 16 includes ball bearings 42 at the four lower corners of the member, which bearings are rotatably held in position by suitable cavity forming elements 44 on the die member. In addition, there is provided along each of the lower sides edges of the male die member 16 an elongated roller bearing 46 which is rotatably supported by a pair of pins 48 or the like. The movable bearing means 42 and 46 thus provided afford sufficient relative movement between the web 12 and the male die member 16 to produce a more uniform stretching of the web across the area engaged by the die member. Of course, these bearing elements might be eliminated, particularly if production is to be carried on at a relatively slow rate, or if the device used in forming the container portion 20 of the package is manually operated, such as might be provided in a restaurant or the like where a relatively small number of packages are prepared periodically for use in the restaurant.

Particular use has been made of this invention in connection with the packaging of individual servings of a semi-fluid substance, specifically jelly. For such purpose, a laminated, double-creped sheet such as is described in the Rowe Patent No. 2,610,935 provided the basic sheet material used in the formation of the container or bottom portions 20 of the package 28. This basic sheet material was impregnated with a mixture of 5 percent polyethylene and 95 percent white microcrystalline wax having a melting point of 180° F. to provide the web 12 illustrated in the drawings. The paper had a crepe ratio of approximately 40 percent, and the amount of the impregnate in the paper was about 20 percent, based on the dry weight of the paper. The method employed in the formation of the packaged units was essentially that described with respect to FIGURE 1, and the temperature in the container forming die was between 150° F. and 160° F. The top for the described container comprised a strip of Pliofilm having a thickness of about .002 inch.

Under the above described conditions the impregnated paper could be satisfactorily drawn and permanently stretched to a depth of about 0.7 inch, while forming a rectangular cavity for the container portion having an area of about 4.0 square inches at its bottom. Thus, about 95 percent of the theoretical stretch of the web was successfully employed without any damage thereto.

It will be understood, of course, that other forms of material capable of stretching in a plurality of directions might be used, and that other types of apparatus might be employed in forming the above described packages, without departing from the principles of this invention. And it is seen that there is provided by this invention, a package comprising materials of relatively low cost and adapted to be formed in a very economical manner and, if desired, at a high rate of production. Consequently, it will be appreciated that this invention is of particular advantage where sanitary conditions are required in providing individual servings of food and the like, but where such could not be achieved heretofore on an economical and practical basis.

I claim:

1. A package comprising a seamless container portion formed from a material comprising universally stretchable bibulous material which provides body to said material and serves as a vehicle for a coating of a moisture impervious thermoplastic material which is applied on the surface which constitutes the inside of the container portion, said container portion including a flat, horizontal border flange continuous with and extending outwardly from the upper edge of said container portion, and a cover portion which is sealed peripherally around the upper surface of said flange.

2. A package comprising a seamless container portion formed from a material comprising a universally stretchable paper which provides body to said material and serves as a vehicle for an impregnant of thermoplastic material which is moisture impervious, said container portion including a bottom, a side wall extending upwardly from said bottom along the periphery thereof, and including a flat, horizontal border flange continuous with and extending outwardly from the upper edge of said side wall, and a flat cover portion which is releasably sealed peripherally around the upper surface of said flange in such manner as to form a hermetic seal, said cover portion including at least one edge portion which does not overlie said flange so as to provide a finger grip for pulling said cover from said flange.

3. A packaging unit comprising a seamless container portion of bibulous paper which is stretchable in a plurality of directions and which includes a moisture impervious, thermoplastic material, said thermoplastic material comprising a mixture of about 5 percent polyethylene and about 95 percent micro-crystalline wax and being present in an amount within the range of from about 15 to about 30 percent by weight of the dry weight of the paper, said container portion including a bottom and side walls providing a predetermined volume for holding a predetermined quantity of packaged material, said container also including a flat, horizontal border flange continuous with and extending outwardly from the upper edge of said side walls, and a cover portion of moisture impervious, heat sealable material which is heat sealed peripherally around the upper surface of said flange to provide a hermetic seal, said cover portion being disposed to project beyond at least one edge portion of said flange to provide a finger grip for peeling said cover from said flange.

4. A package comprising a seamless container portion formed from an integral sheet of universally stretchable paper which is impregnated with a moisture impervious, thermoplastic material, said thermoplastic material comprising a mixture of about 5 percent polyethylene and about 95 percent micro-crystalline wax and being present in an amount within the range of from about 15 to about 30 percent by weight of the dry weight of the paper, said container portion having a main body portion of sufficient volume to hold a predetermined quantity of packaged material and a flat, horizontal border flange continuous with and extending outwardly from the upper edge of said main body portion, a cover of moisture impervious, heat sealable material which is heat sealed peripherally around the upper surface of said flange to provide a hermetic seal, said cover portion being unsealed with respect to said flange at least at the edge of one corner to provide a finger grip for peeling said cover from said flange.

5. A package comprising a seamless container portion of double creped paper which is coated on its upper surface with a moisture impervious, thermoplastic material, said coating comprising a mixture of about 5 percent polyethylene and about 95 percent micro-crystalline wax and weighing between about 15 to about 30 percent of the dry weight of said paper, said container portion having a main body portion adapted to hold a predetermined quantity of packaged material and a flat, horizontal border flange continuous with and extending outwardly from the upper edge of said main body portion, said body portion and flange being formed by directing pressure on a central portion of said paper to thereby stretch the paper transversely of its normal plane and at said central portion, whereby the outer periphery of said border flange retains a relatively rough, creped surface and the inner edge of said flange which is continuous with said main body portion has a relatively smoother surface, and a cover portion of moisture impervious, heat sealable material which is heat sealed peripherally around said outer periphery of said flange to provide a hermetic seal, said cover portion extending at least in part beyond the sealed periphery to provide a finger grip for removing said cover from said flange.

(References on following page)

References Cited in the file of this patent

UNITED STATES PATENTS

| | | |
|---|---|---|
| 1,576,088 | Bunz | Mar. 9, 1926 |
| 1,622,685 | Stoltz et al. | Mar. 29, 1927 |
| 2,077,438 | Rowe | Apr. 20, 1937 |
| 2,106,867 | Brady | Feb. 1, 1938 |
| 2,155,445 | Pittenger et al. | Apr. 25, 1939 |
| 2,331,762 | Brown | Oct. 12, 1943 |
| 2,516,373 | Ehlert et al. | July 25, 1950 |
| 2,547,078 | Garfield | Apr. 3, 1951 |
| 2,549,069 | Donofrio | Apr. 17, 1951 |
| 2,565,336 | Adler | Aug. 21, 1951 |
| 2,582,037 | Hyde | Jan. 8, 1952 |
| 2,633,430 | Kellgren et al. | Mar. 31, 1953 |
| 2,649,392 | Marshall | Aug. 18, 1953 |
| 2,736,656 | Marshall | Feb. 28, 1956 |